United States Patent [19]

Benson

[11] 3,952,615

[45] Apr. 27, 1976

[54] SAW CHAIN SHARPENING SYSTEM

[75] Inventor: Clarence Eugene Benson, Milwaukie, Oreg.

[73] Assignee: Carlton Company, Portland, Oreg.

[22] Filed: Jan. 22, 1975

[21] Appl. No.: 542,925

[52] U.S. Cl. .............................. 76/25 A; 51/74 BS; 76/37
[51] Int. Cl.² ..................... B23D 63/16; B24B 3/36
[58] Field of Search ................ 76/25 A, 37, 40, 41, 76/74, 75, 76, 77, 78 R, 78 A; 51/74 R, 74 BS, 215 E, 285; 269/270

[56] References Cited
UNITED STATES PATENTS

| | | | |
|---|---|---|---|
| 1,221,343 | 4/1917 | Mackintosh | 76/41 |
| 2,701,975 | 2/1955 | Evanoff | 76/25 A |
| 3,006,222 | 10/1961 | McEwan | 76/78 R X |
| 3,432,159 | 3/1969 | Rakatansky | 269/270 X |
| 3,859,762 | 1/1975 | Ludwig | 51/285 |

*Primary Examiner*—Al Lawrence Smith
*Assistant Examiner*—Nicholas P. Godici
*Attorney, Agent, or Firm*—Kolisch, Hartwell, Dickinson & Stuart

[57] ABSTRACT

Apparatus for sharpening cutters distributed along a saw chain, the apparatus including a support track along which a reach of saw chain may be moved and multiple sharpeners spaced along the path for sharpening cutters carried thereto. Multiple cutter engaging elements are operable to engage selected, spaced cutters on the reach of chain and shift them into approximate sharpening positions adjacent the sharpeners, at which point cutter holding clamps operate to precisely position the cutters relative to the sharpeners. The cutter engaging elements, holding clamps, and sharpeners are so spaced in the apparatus that slack is maintained in the portions of the chain between the selected cutters throughout movement in the apparatus and sharpening.

9 Claims, 6 Drawing Figures

U.S. Patent   April 27, 1976   3,952,615
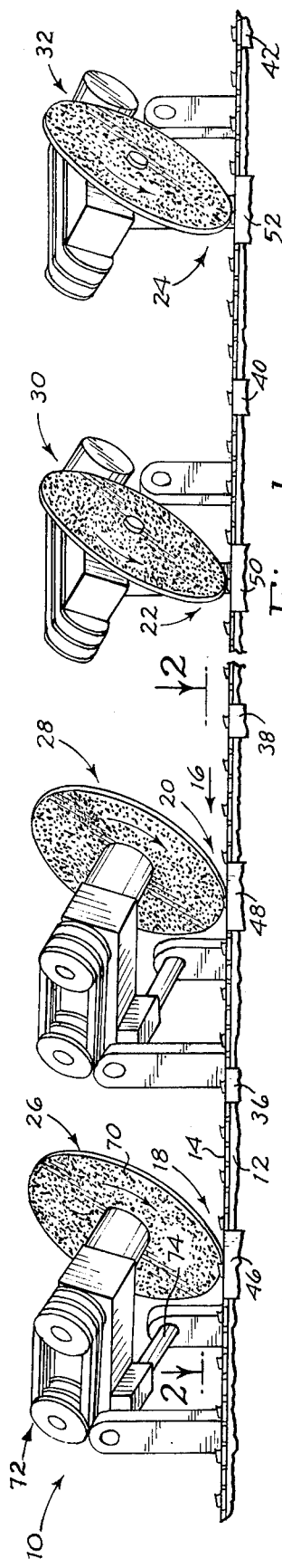
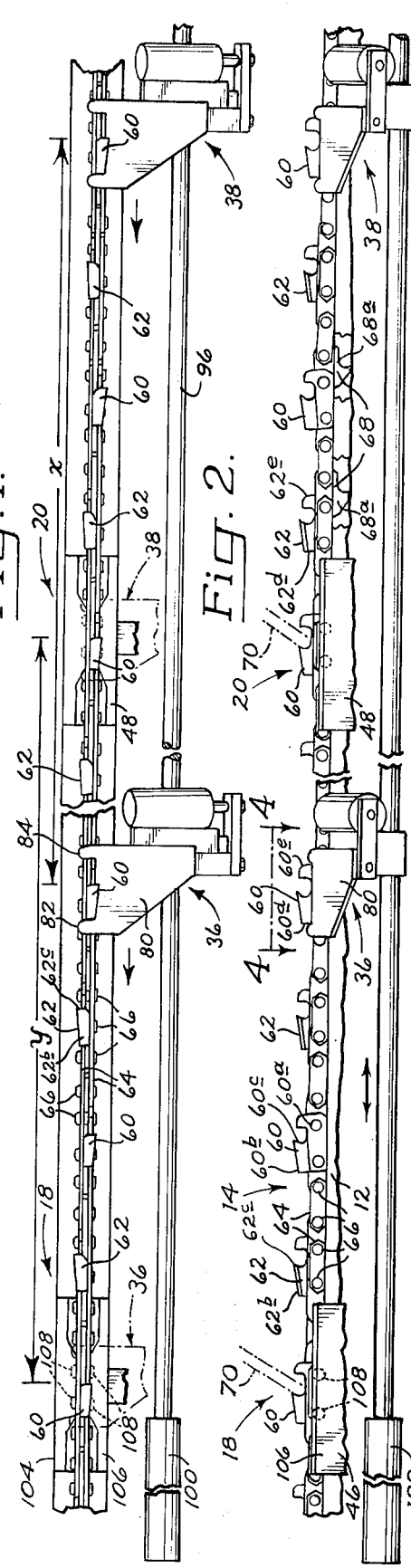
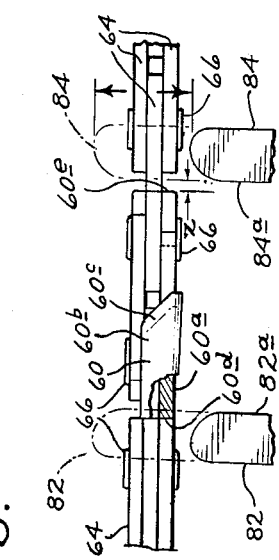
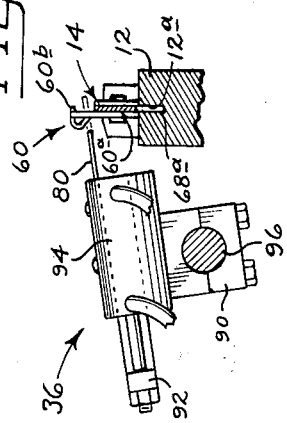
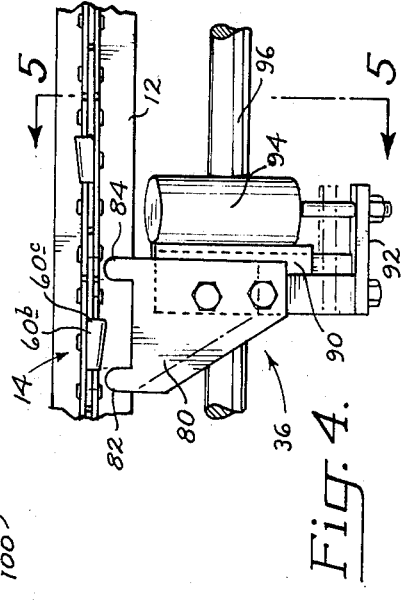

SAW CHAIN SHARPENING SYSTEM

BACKGROUND AND SUMMARY OF THE INVENTION

This invention relates to apparatus for positioning a workpiece in a work station, and more particularly to apparatus for positioning multiple cutters on an elongate reach of saw chain adjacent spaced sharpeners with slack being maintained in the portions of the reach of chain between the sharpeners.

A saw chain includes a plurality of elongate links which are pin-connected to each other at adjacent sets of their ends. The cutter elements in the chain have bit portions which extend above remainder portions of the chain and have chisel-like forwardly facing cutting edges which perform the cutting during operation of the saw chain. In the past, such cutters have been sharpened individually by apparatus in which the chain is advanced merely one cutter link at a time for sharpening.

Sharpening of only one cutter at a time, however, is more time consuming and less efficient than is the sharpening of a plurality of cutters with a plurality of sharpeners spaced along a length of the chain. It has been found however, that multiple station sharpening cannot be performed effectively merely by pulling the chain along a path adjacent the plural sharpeners. When a saw chain is tensed and pulled along a path from one end the variations in positioning of the pins in the chain and the variations which occur in the sizes of the bores for receiving the pins and the diameters of the pins themselves accumulate over the reach of chain. Such accumulated variations in the chain are sufficient to defeat any attempt to position the spaced-apart cutters precisely relative to the plural sharpeners merely by pulling the chain along the path.

A general object of the present invention is to provide novel multiple station sharpening apparatus for sharpening cutters distributed along a reach of saw chain, which apparatus is operable to precisely position multiple cutters for efficient and rapid sharpening.

More specifically an object of the invention is to provide such sharpening apparatus in which selected cutters in a reach of chain are engaged by cutter engaging elements to produce a degree of slack in portions of the reaches therebetween and, while maintaining such slack in the portions of the chain between the selected cutters, conveying the cutters to the sharpening stations adjacent the sharpeners, at which stations they may be precisely positioned for sharpening. With slack produced between selected sharpeners, precise positioning of the cutters in multiple sharpening stations may be accomplished.

Another object of the present invention is to provide positioning means for conveying a workpiece into an approximate desired position in a work station, and through the use of workpiece holding mechanism, precisely positioning and holding the workpiece in the station for operation.

DRAWINGS

These and other objects and advantages will become more fully apparent as the following description is read in conjunction with the drawings wherein:

FIG. 1 is a somewhat schematic elevation view of apparatus constructed according to an embodiment of the invention;

FIG. 2 is an enlarged top plan view of a portion of the apparatus taken generally along the line 2—2 in FIG. 1;

FIG. 3 is a side elevation view of the portion of the apparatus illustrated in FIG. 2;

FIG. 4 is an enlarged view taken generally along the lines 4—4 in FIG. 3 of a cutter engaging element and a portion of its operating mechanism;

FIG. 5 is a view taken generally along the line 5—5 in FIG. 4; and

FIG. 6 is an enlarged top view of the outer ends of a pair of engaging fingers of the cutter engaging element.

DETAILED DESCRIPTION OF AN EMBODIMENT OF THE INVENTION

Referring now to the drawings, and more specifically to FIG. 1, at 10 is indicated generally apparatus constructed according to an embodiment of the invention. In general terms, the apparatus includes a track 12 for supporting an elongate reach of saw chain 14 for movement along a path longitudinally of the chain in the direction of arrow 16. Sharpening, or work, stations 18, 20, 22, 24 are spaced apart along the path along which a reach of chain is moved. Adjacent each of stations 18, 20, 22, 24 are sharpening devices 26, 28, 30, 32, respectively, for sharpening cutters on the reach of saw chain held in the respective work stations. Sharpening devices 26, 28 are positioned in the apparatus for sharpening what may be referred to as right-hand cutters, or cutter elements, and sharpening devices 30, 32 are positioned to sharpen what may be referred to as left-hand cutters, or cutter elements, on the saw chain.

Associated with each of sharpening stations 18, 20, 22, 24 is a cutter positioning device 36, 38, 40, 42, respectively, each of which is operable to engage a portion of the chain and shift it in the direction of the path denoted by arrow 16 to place a selected cutter in its associated sharpening station. At each sharpening station 18, 20, 22, 24 is a cutter holding device 46, 48, 50, 52, respectively, operable, as will be described in greater detail below, to precisely position and grip a cutter for holding the same securely during a sharpening operation.

Referring to FIGS. 2 and 3, a saw chain 14 includes a plurality of right-hand cutter elements, or links, 60 and left-hand cutter elements, or links, 62. The right-hand and left-hand cutter elements are mounted on opposite sides of the saw chain and are disposed in spaced-apart positions alternating along the length of the saw chain.

A cutter element, and referring to a right-hand cutter 60 as illustrated in FIGS. 3-6, includes an elongate base portion 60a which substantially parallels a side of the saw chain, and a bit portion 60b disposed substantially normal to portion 60a and extending inwardly over remainder portions of the chain. The cutting, or chisel, edge 60c is at one end of bit portion 60b. Edge 60c is that portion of the cutter which is to be sharpened in the apparatus. As is seen in FIG. 6, the cutting edge of the cutter element is disposed at an angle relative to the longitudinal axis of the chain and thus the sharpener must be positioned and operable to produce an undercut, beveled surface at such angle in the sharpening process. The cutter element also has substantially upright, opposed upstream and downstream facing surfaces 60d, 60e, respectively.

Left-hand cutter elements 62 are mirror images of the right-hand cutter elements. The left-hand cutter elements have base portions which are mounted in the chain on the opposite side of the chain from base portions 60a of cutters 60. Bit portions 62b extend inwardly over the top of the chain and have cutter, or chisel, edges 62c thereon. The cutting edge 62c on a cutter element 62 extends at an angle relative to the longitudinal axis of the saw chain which is the opposite of the angle of a right-hand cutter element. Thus, the sharpener to be used therewith must be positioned at an angle different from the sharpener to be used with right-hand cutter elements.

Right-hand and left-hand cutter elements 60, 62 are interconnected by connecting links 64. Rivets 66 act as pivot pins between the links to pivotally connect links 64 to the cutter elements.

Adjacent each of the cutter elements, and also pivotally connected in the saw chain by rivets 66 are drive links 68 having lower portions 68a which depend below remainder portions of the chain. Portions 68a of links 68 are slidably received in a groove 12a extending along track 12 to guide the chain as it is carried longitudinally through the apparatus.

Each of sharpeners 26, 28, 30, 32 includes a grinding wheel, or disk, 70 mounted for rotation in the direction illustrated by the arrows and connected through pulleys and drive belts 72 to a motor for producing rotation of the grinding wheel. Each grinding wheel and its drive mechanism are pivotally mounted on an inclined shaft 74 for shifting between the sharpening positions illustrated in FIG. 1 disposed at the correct angles for sharpening right-hand and left-hand cutter elements, respectively, and positions swung up and away from the saw chain. Operating mechanism (not shown) is operable selectively to swing the grinding wheels between their sharpening and removed positions.

Describing a cutter positioning device in detail and referring specifically to device 36, as illustrated in FIGS. 4 and 5, it will be seen that such includes a substantially planar cutter engaging element 80. Element 80 includes a pair of laterally spaced fingers, or finger portions, 82, 84 which project outwardly from remainder portions of the element toward the path for the saw chain. The spacing between inwardly facing surfaces 82a, 84a of the fingers (see FIG. 6) is substantially equal to the distance between upstream and downstream facing surfaces 60d, 60e, respectively, of a cutter element. As is best seen in FIG. 6, surfaces 82a, 84a diverge as they progress outwardly toward the outer end extremities of the fingers.

Cutter engaging element 80 is slidably mounted on a support 90 for shifting laterally of the path of the saw chain toward and away from the saw chain, between the cutter release position as illustrated in solid outline in FIGS. 4–6 and a cutter engaging position as illustrated in solid outline in FIGS. 2 and 3 and in dot-dashed outline in FIGS. 5 and 6. In its cutter release position, the engaging element is spaced from the path of the saw chain. When shifted to its engaging position, fingers 82, 84 are contiguous upstream and downstream faces 60d and 60e, of the cutter.

Cutter engaging element 80 is operatively connected, through an arm 92, to the rod end of a fluid pressure operated double-acting ram 94 which is secured to support 90. Extension of ram 94 shifts element 80 to its release position and contraction of the ram shifts the element to its cutter engaging position.

Support 90, in turn, is secured to a shaft 96 extending parallel to track 12 and mounted for reciprocation along a path paralleling track 12. Shaft 96 is operatively connected to an extensible, contractible, double-acting, fluid pressure operated ram 100 which, on actuation, is operable selectively to shift shaft 96 either to the right or to the left in FIGS. 2, 3 and 4.

Describing one of the holding devices, and referring specifically to device 46, the same includes a pair of opposed clamping jaws 104, 106 spaced on opposite sides of the path along which chain 14 travels. The jaws define a portion of the track along which the reach of saw chain may travel through the apparatus. Such a holding device is described in detail in a co-pending patent application entitled "Positioning Clamp", Ser. No. 520,291, filed Nov. 4, 1974, and assigned to the assignee of the present invention.

Such clamping jaws have depressions therein, indicated in dashed outline at 108, which complement the configuration of the heads of rivets 66. Depressions 108 are adapted to receive and hold the heads of rivets 108 connecting cutter elements in the saw chain. The clamping jaws are yieldably biased toward each other, whereby the same may be clamped against a cutter element with the rivets connecting the same in the chain received in depressions 108 to precisely position the cutter element in a sharpening station. Means (not shown) which is described in the above-referred to co-pending application is operable to spread clamping jaws 104, 106 when desired to permit travel of saw chain 14 therebetween.

Referring to FIG. 2, the dimension "Y" indicates the distance between the centers of sharpening stations 18, 20 in which a spaced pair of right-hand cutter elements 60 are held by holding devices 46, 48, respectively. Dimension Y is a distance slightly less than the distance which would exist between the cutting edges of the held cutter elements if the portion of the reach of saw chain therebetween were tensed. Thus, when spaced cutter elements 60 are held by holding devices 46, 48 the portion of the reach of chain 12 therebetween is slacked. The distances between stations 48, 50, and 52 likewise are less than the distance which would exist between cutter elements held thereby if the chain were tensed, thus to produce slack reaches of saw chain between such holding devices.

Similarly, the distance "X" indicated in FIG. 2 between the centers of positioning devices 36, 38 is substantially equal to the distance between their associated holding devices 46, 48. Likewise, the distances between positioning devices 48 and 50 and devices 50 and 52 are substantially equal to the spacing between their associated work stations.

Control and limiting means is operatively connected to ram 100 and shaft 96 whereby the ram is operable to shift the positioning devices to the right in FIGS. 2 and 3 to positions to engage selected cutters, and on shifting of the shaft to the left in FIGS. 2 and 3 to carry the cutter elements engaged by the positioning devices to positions proximate the desired sharpening stations in the apparatus.

Describing the operation of the apparatus thus described, initially the grinding wheels on the sharpening devices are raised to permit travel of saw chain 14 longitudinally along track 12. The clamping jaws of the holding devices are released to permit travel of the chain therethrough. With positioning devices 36, 38, 40, 42 at the right end of their travel as illustrated in FIGS. 2 and 3, upstream from their associated sharpening stations, they are in a position to engage selected cutter elements to be conveyed to the sharpening stations.

Retraction of ram 94 in each of the positioning devices shifts its associated cutter engaging element from its release position, as illustrated in FIGS. 4 and 6, to its engaging position as illustrated in solid outline in FIGS. 2 and 3 and in dot-dash outline in FIG. 6. As is seen in FIG. 6, as the engaging element is shifted to its engaging position the diverging forward ends of fingers 82, 84 guide the cutter element into proper position therebetween. In FIG. 6, cutter element 60 is illustrated in solid outline in a position it may occupy with the chain in a tensed condition. On shifting of the fingers into engagement with upstream and downstream ends of the cutter element, the cutter element is shifted the distance "Z" in an upstream direction to properly align it with the engaging element. With all of the positioning elements being spaced from each other a distance less than the spacing which would exist between the cutter elements engaged if the chain reaches therebetween were in a tensed position, a degree of slack is produced in the portions of chain reach therebetween.

After engagement of the selected cutters by the engaging elements, ram 100 is retracted to move shaft 96 to the left in FIGS. 2 and 3 to position engaging elements and the cutters held thereby in their selected sharpening stations and between clamping jaws 104, 106 of the holding devices. The clamping jaws then are clamped against opposite sides of the cutter elements, with the rivets on a cutter element being received in the previously mentioned depressions in the clamping jaws to precisely position the cutter element for sharpening. The grinding wheel in each of the stations then is lowered to a sharpening position in which it can operate on a precisely positioned cutter element in the work station associated therewith.

Such apparatus is particularly advantageous in the production of saw chain, since automated machinery may be used to produce long stretches of saw chain with unsharpened cutter elements therein. The cutter elements are assembled in the chain prior to being sharpened to prevent dulling or chipping of the cutting edges which might occur during assembly and handling.

The length of saw chain produced then may be carried through the apparatus of the present invention to sharpen multiple cutter elements in each step of the operation. By providing positioning devices which produce slack in the saw chain between cutter elements held for sharpening the cutter elements may be precisely positioned as required for sharpening in multiple stations.

The spacing between the right-hand cutter sharpening devices 26, 28 is such that sharpening device 26 sharpens every other right-hand cutter element along the length of the chain and cutter element 28 sharpens the remainder of the right-hand cutter elements. Sharpening devices 20, 32 are similarly spaced to sharpen alternate left-hand cutter elements along the length of the chain.

While a preferred embodiment of the invention has been described herein, it should be apparent to those skilled in the art that variations and modifications are possible without departing from the spirit of the invention.

It is claimed and desired to secure by Letters Patent:

1. Apparatus for sharpening cutters distributed along a saw chain comprising support means defining a support path along which an elongate reach of saw chain may be moved longitudinally through the apparatus, a plurality of spaced-apart sharpening stations distributed along said path, sharpening means adjacent each station for sharpening a cutter positioned therein, and positioning means adjacent said path operable to advance said reach of chain along said path to position selected cutters on said reach of saw chain in different sharpening stations with slack existing in portions of said reach between said sharpening stations.

2. The apparatus of claim 1, wherein said positioning means comprises a plurality of spaced cutter engaging means each of which is shiftable between a cutter release position and a cutter engaging position for engagement with a selected cutter and mounted for movement in one direction along said path between a first position spaced upstream in said path from a sharpening station and a second position in said sharpening station for advancing a cutter engaged thereby to said sharpening station.

3. The apparatus of claim 2, wherein the spacing between adjacent sharpening stations is less than the spacing between selected cutters on said saw chain when said chain is tensed and the spacing between cutter engaging means for advancing cutters to said sharpening stations is substantially equal to the spacing between said adjacent sharpening stations.

4. The apparatus of claim 2, wherein said positioning means further comprises holding means at a sharpening station operable to hold a selected cutter securely in a desired position relative to said station for sharpening.

5. The apparatus of claim 1, wherein said positioning means comprises means for advancing a pair of spaced cutters along said path and positioning the same proximate a pair of adjacent sharpening stations and holding means for precisely positioning and holding said cutters advanced to said stations in selected positions relative to said stations, with the spacing between said cutters as held by said holding means being less than the distance between said cutters with the chain reach therebetween tensed.

6. The apparatus of claim 1, wherein said positioning means comprises a pair of cutter engaging elements each associated with a different sharpening station and spaced apart a distance substantially equal to the spacing between their associated sharpening stations, means for shifting said elements between cutter release and cutter engaging positions and operable on shifting the same to their engaging positions to establish spacing between the cutters engaged thereby which is less than the spacing between said cutters when said chain reach is tensed to produce slack in the portion of saw chain between said elements, and powered means operatively connected to said cutter engaging elements for moving the same and cutters engaged thereby to their associated sharpening stations while maintaining said established spacing between said cutters.

7. The apparatus of claim 6, wherein a cutter has opposed end surfaces, one of which faces upstream in said path and the other of which faces downstream in said path, and a cutter engaging element comprises a pair of spaced fingers, the inwardly facing side surfaces of which are spaced apart in a direction longitudinally of said path a distance substantially equal to the distance between said upstream and downstream faces of a cutter and said cutter engaging element on shifting to its cutter engaging position is disposed with said side surfaces of said fingers contiguous opposite ones of said faces of the cutter and on shifting to its release position is disposed with said fingers spaced laterally of the cutter path.

8. The apparatus of claim 7, wherein outer end portions of said inwardly facing surfaces of said fingers diverge on progressing toward the end extremities of said fingers.

9. The apparatus of claim 7, which further comprises power actuated means operatively connected to a cutter engaging element for shifting the same between its cutter engaging and release positions.

* * * * *